A. M. WOLF.
SPEED CONTROLLING MECHANISM.
APPLICATION FILED JULY 11, 1908.
928,727.
Patented July 20, 1909.
5 SHEETS—SHEET 1.
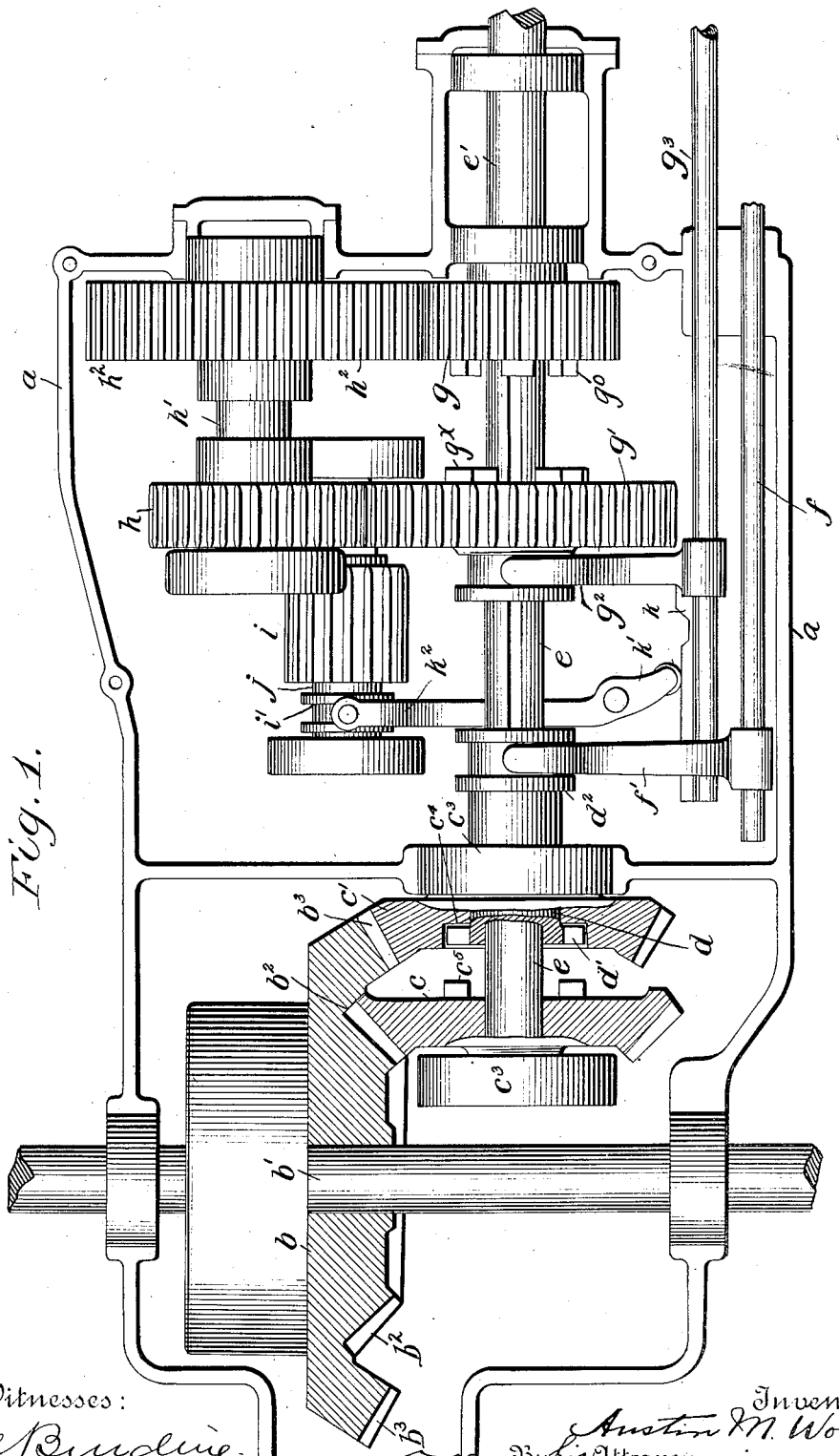

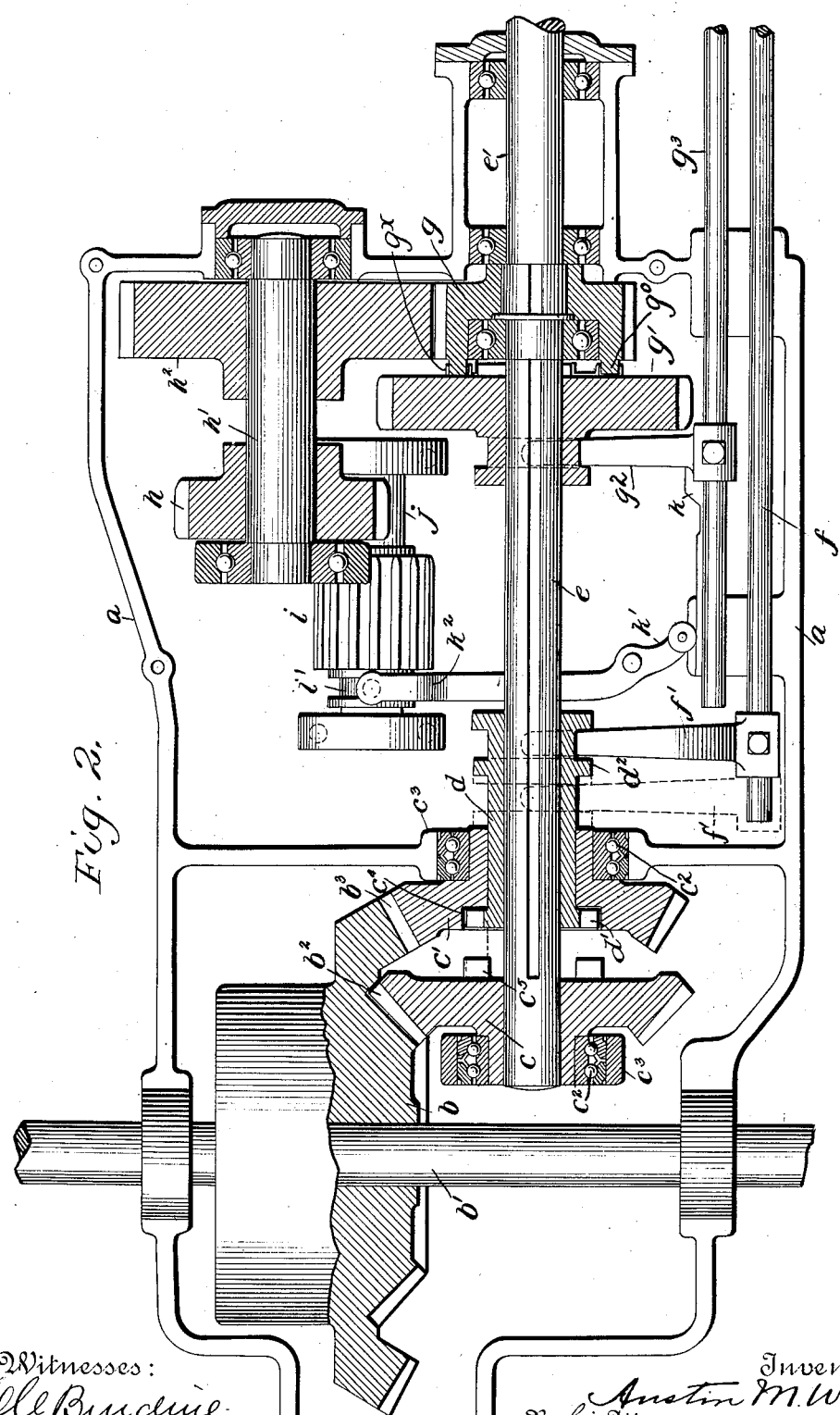

A. M. WOLF.
SPEED CONTROLLING MECHANISM.
APPLICATION FILED JULY 11, 1908.
928,727.
Patented July 20, 1909.
5 SHEETS—SHEET 3.
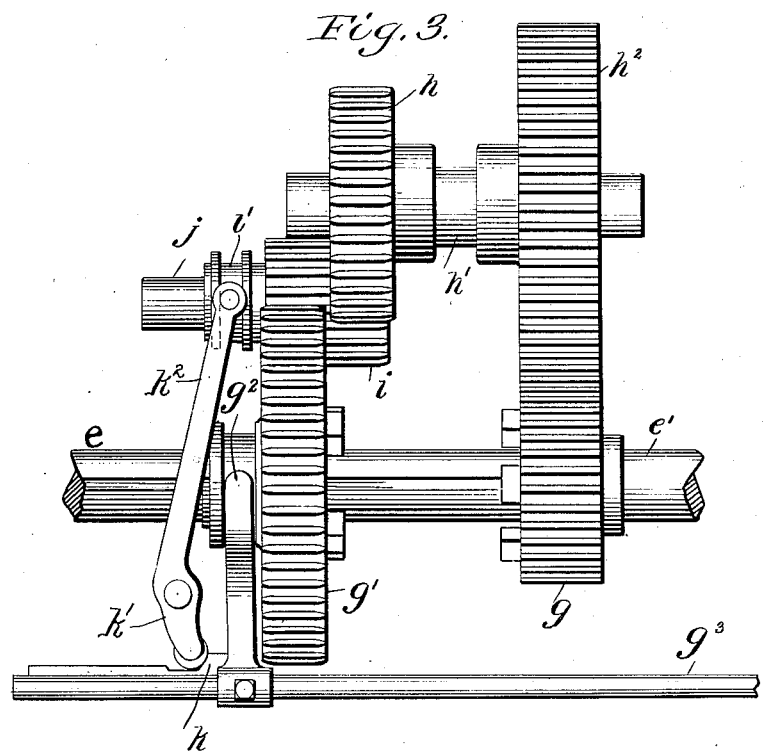
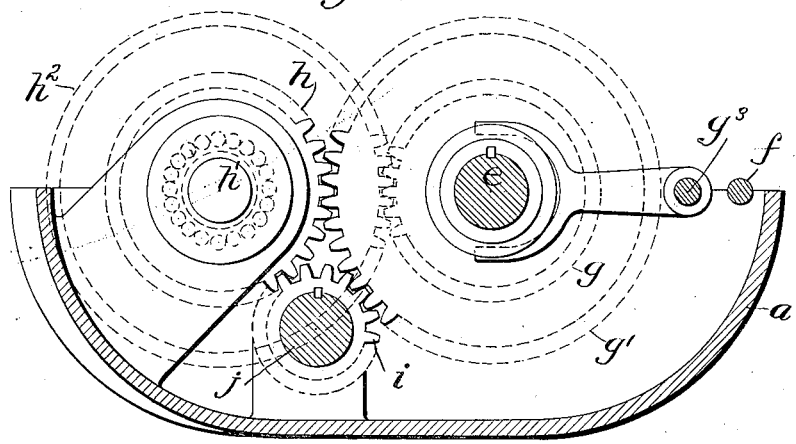
Witnesses:
Inventor
Austin M. Wolf
By his Attorney
Geo. L. Wheelock

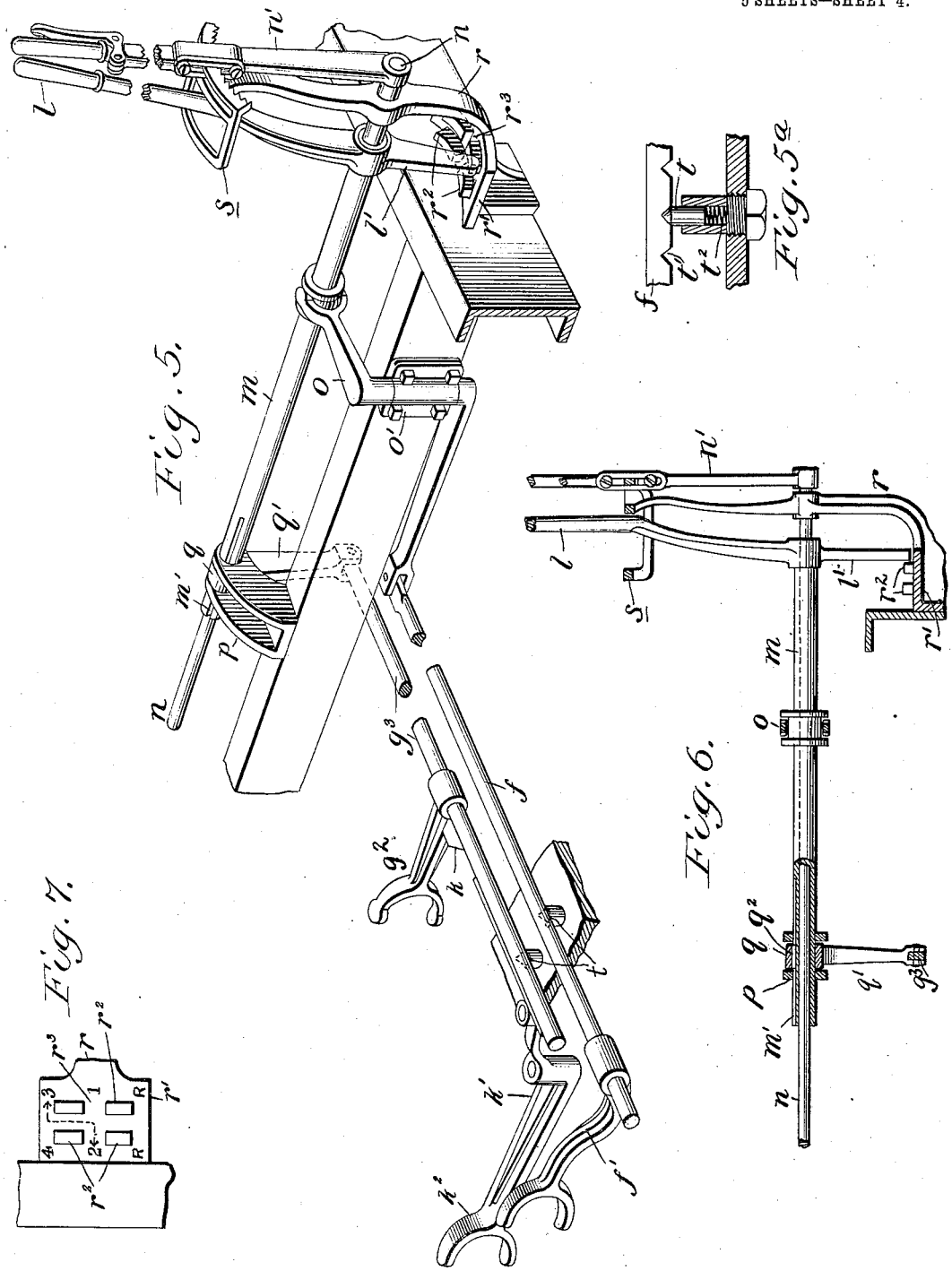

A. M. WOLF.
SPEED CONTROLLING MECHANISM.
APPLICATION FILED JULY 11, 1908.
928,727.
Patented July 20, 1909.
5 SHEETS—SHEET 5.
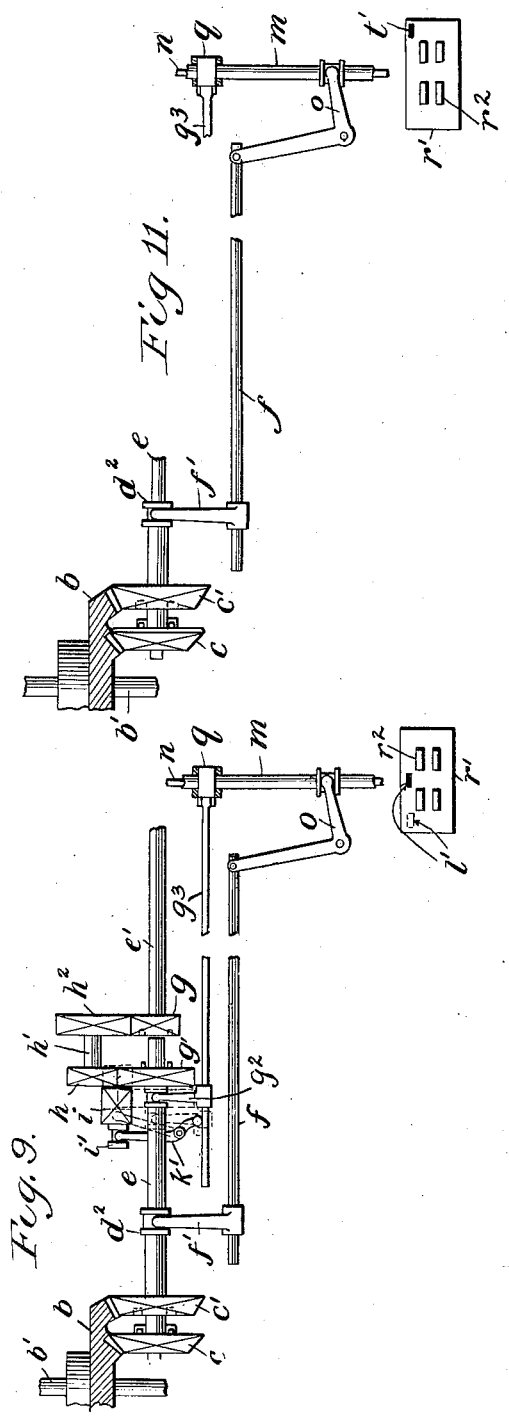
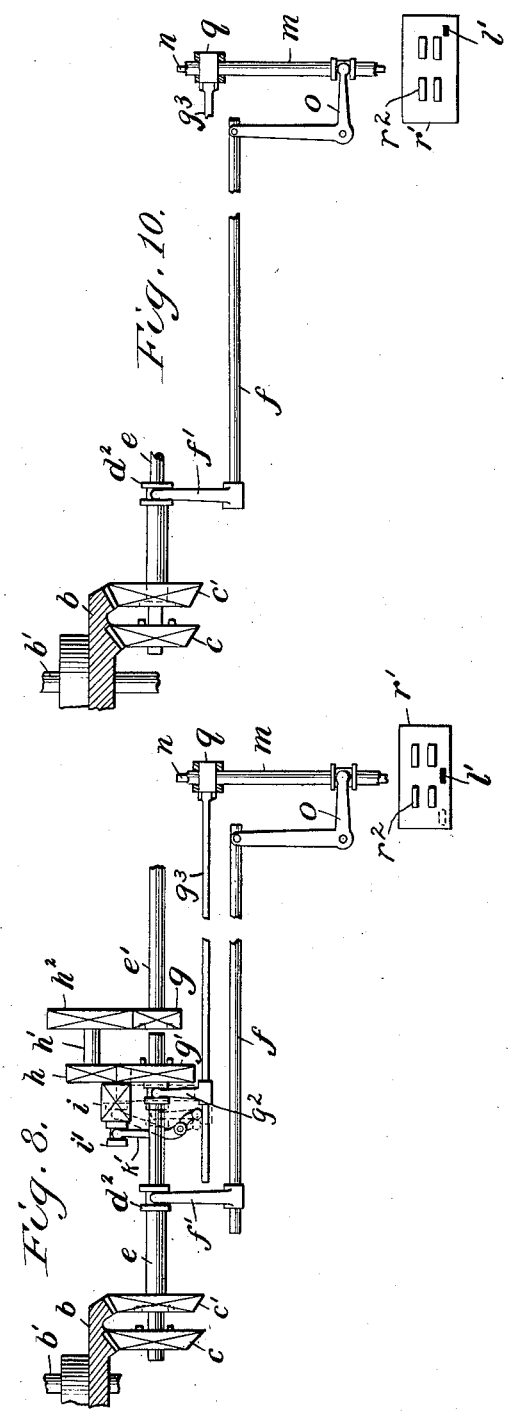
Witnesses:
Inventor
Austin M. Wolf
By his Attorney
Geo. F. Wheelock

UNITED STATES PATENT OFFICE.

AUSTIN M. WOLF, OF NEW YORK, N. Y.

SPEED-CONTROLLING MECHANISM.

No. 928,727.     Specification of Letters Patent.     Patented July 20, 1909.

Application filed July 11, 1908. Serial No. 443,089.

*To all whom it may concern:*

Be it known that I, AUSTIN M. WOLF, a citizen of the United States, residing at New York, in the borough of Manhattan, county and State of New York, have invented certain new and useful Improvements in Speed-Controlling Mechanism for Motor-Vehicles, of which the following is a specification.

This invention relates to speed controlling mechanism for motor vehicles, and the objects of the invention are to provide a simple and efficient change gearing and effective and simple selective or control devices for the gearing.
Further objects are to simplify and render more efficient the details of construction.

In order that my invention may be fully understood I will now proceed to describe it with reference to the accompanying drawings, showing a desirable form of the invention, and in which—

Figure 1 is a plan view of the change speed gears; Fig. 2 is a horizontal section of the same parts in different position; Fig. 3 is a side view of some of the gears showing how the reversing gear is used; Fig. 4 is a cross sectional view showing the same parts; Fig. 5 is a perspective view of the controlling devices for shifting the speed change gears;
Fig. 5ª is a detail view of a locking device; Fig. 6 is a broken sectional view of some of said parts shown in Fig. 5; Fig. 7 is a detail view of my improved controlling lever footplate; and Figs. 8, 9, 10 and 11 are diagrammatic views showing the positions of the parts brought into play in the four different speed positions.

Referring to the drawings, Figs. 1, 2, 3 and 4, the gear box or case $a$ may be of suitable construction, and contains my improved speed change gears, comprising a double bevel or crown-wheel $b$ mounted on driven shaft $b'$ of the motor vehicle, with its two series of teeth $b^2$, $b^3$, in constant mesh with bevel gears $c$, $c'$, that are mounted to turn on ball bearings $c^2$ carried by suitable boxes $c^3$ supported from the gear-case. A tubular clutch member or sleeve $d$ is adapted to engage, at will, either of said gears $c$, $c'$, to which end it has a head $d'$ which engages either in recesses $c^4$ in gear $c'$ or with lugs $c^5$ on gear $c$. Said clutch member is feathered on a driving shaft $e$ alined with the engine or power shaft $e'$ and has a bearing throughout its length or from end to end on the shaft $e$ and may be shifted lengthwise as by a shifting rod $f$ having a yoke $f'$ taking into the groove of a hub $d^2$ on said member. Upon the power shaft $e'$ there is mounted a gear $g$ which forms a clutch member to be engaged with another clutch member formed by a gear $g'$ that is feathered on shaft $e$ so as to be shifted thereon by a yoke $g^2$ carried by a shifting rod $g^3$. Shafts $e$, $e'$, form practically one shaft when the clutch portions $g^0$, $g^x$, of gears $g$, $g'$ are engaged. The latter is the case for a direct drive, and two speeds may then be obtained by making gears $c$ or $c'$ turn with the power shaft. For reducing speed the gear $g'$ is shifted to engage with a gear $h$ located on a suitably mounted countershaft $h'$ which is driven by the engagement of gear $g$ with a gear $h^2$ on said shaft $h'$.

The parts described operate as follows: To secure the lowest speed, gear $g'$ is shifted to mesh with gear $h$, so that the driving shaft $e$ is driven slower than power shaft $e'$, and the gear $c'$ is clutched so as to give a slow movement to driven gear $b$. To secure higher speed, the gear $c'$ is disconnected and the gear $c$ is clutched. In both of these cases the speed reducing gears $h$ and $h^2$ are used. To secure a still higher speed the gear $g'$ is shifted and becomes a clutch member which engages the gear $g$, and the gear $c'$ is again clutched. The highest speed is obtained when the gear $c'$ is disconnected and gear $c$ clutched, but in both of the last two changes of speed the reducing gear runs idle. For the reverse, an intermediate shiftable reversing gear $i$ is used, the same being mounted on a suitably supported fixed shaft $j$ at a point so that it may be shifted to mesh with and connect the gears $g'$ and $h$. The longitudinal shifting of gear $i$ is done by the shifting rod $g^3$ which has a cam $k$ that may be brought in contact with the short arm of a pivoted lever $k'$. Lever $k'$ has a yoke $k^2$ which takes into a groove in the hub $i'$ of said gear $i$. The movements of the gears $g'$ and $i$ are so timed in shifting them for reverse that they are caused to mesh before the reversing gear $i$ is meshed with the gear $h$.

The control of the speed gears is effectuated through the medium of my improved controlling or selecting devices, shown clearly in Figs. 5, 6 and 7, which act through the rods $f$ and $g^3$, on said gears. To this end, a control-lever $l$ is mounted on a tube $m$ which is longitudinally shiftable on the brake-operating shaft $n$, which has a brake-lever $n'$. The longitudinal movement of the tube

*m* imparts a rocking movement to a cranked rock-shaft or bell-crank lever *o* which is journaled in a box *o'*, and the long arm of said lever *o* is pivotally connected with the shifting rod *f*, thus enabling the shifting of the parts under control of said rod *f*. Mounted on the frame of the vehicle or machine is a double-eared bracket *p*, between the ears of which is located the hub *q* of a downwardly projecting rock-arm *q'* which is pivotally connected with the rod *g³*. Said hub *q* has a feather or spline *q²* which engages in a longitudinal groove *m'* in the tube *m*, to permit the tube to rock said arm *q'* without interfering with the longitudinal shifting movement of the tube. In actuating the rod *g³* from the rock-arm *q'*, the full power of the control-lever is utilized for doing the greater amount of work required. The shaft *n* on which said tube is mounted is preferably supported from a standard or upright *r* which has a foot-piece or guide *r'* and is suitably fixed to the frame-work. The movements of the control-lever *l* are confined by an open-stop-frame *s* at the top of standard *r*, through which the lever-handle projects, and the positions and movements of the said lever for the different speeds are determined by four suitably spaced lugs *r²* on the foot-piece, the lever having an extension or pointer *l'* which may move about and between the lugs, constituting the field of movement of the latter. These lugs are clearly shown in Fig. 7. The spaces between the lugs are lettered *r³*. Such a construction is believed to simplify the usual means for selecting and controlling the speeds and to also save the chauffeur much trouble and time, as the lever *l* may be quickly moved from one position to another, the stop-frame *s* confining the movements of the lever within limits. The required movements of the control-lever are thus reduced to a minimum. The ends of the spaces *r³* between the four lugs *r²* are conveniently numbered 1, 2, 3, 4, for indicating the different speeds, and the letter "R" shows to which side of the lugs the lever extension *l'* is to be moved for reversal of movement.

Figs. 8–11 and Figs. 5 and 7 illustrate clearly how the parts are shifted for the various speeds. For the lowest speed the control-lever *l* is moved so that its extension *l'* will be set out of contact with the lugs but over point 1, giving the position shown in Fig. 8; for the next speed the point 2, giving the position to Fig. 9; the next the point 3, giving the position shown in Fig. 10; and for the highest speed, the point 4, giving the position shown in Fig. 11. In stepping up from 1 to 4 the lever *l* may be pulled and shifted in a practically straight line, except in shifting from 2 to 3, when a corner has to be turned, as indicated by the double arrow Fig. 7. In reversing, the control-lever may be shifted in a direct line, from any speed, to the reverse position; although either of two reverse speeds can be secured by shifting to either reverse position, indicated by R. Or, the shift can be from one to another reverse position to secure two reverse speeds. Thus it is apparent that the described guiding means for the control-lever enables the obtaining of any one of six different positions for the lever, the latter being guided in three possible lines at an angle to two possible lines.

Means for securing the control-lever and its operated parts in their shifted positions are provided by the lock-pins such as *t*, shown in detail in Fig. 5ª which are suitably supported in the gear-case *a* and are pressed into notches *t'* in the shifting rods *f* and *g³*, by the springs *t²*.

Having thus described my invention with reference to a desirable form thereof, but without restricting myself as to the form shown because parts may be omitted, added, modified and substituted without departing from the spirit and scope of the invention, what is claimed as new and of my invention is:

1. In speed controlling mechanism for motor vehicles, the combination of a power shaft, a variable speed driving shaft, a shiftable gear on the driving shaft, a gear on the power shaft having an enlarged chamber adjacent said shiftable gear, said shiftable gear being of greater diameter than said power shaft gear, a ball bearing contained in the said chamber of said power shaft gear, said driving shaft terminating in the body of said power shaft gear and turning in said ball bearing, a counter-shaft, a pair of gears on the counter-shaft of different diameter, the small and large gears of the power and driving shafts having clutching means, and being arranged to mesh respectively with the large and small gears of the counter-shaft, means for shifting the shiftable gear to mesh with the smaller gear of the counter-shaft, or to couple it with its companion gear whereby two speeds for the variable speed driving shaft are obtained, a driven shaft, and means for driving the driven shaft at two speeds relatively to the said driving shaft, whereby the driven shaft may have four speeds relatively to the power shaft.

2. In speed controlling mechanism for motor vehicles, the combination of a power shaft, a variable speed driving shaft, a gear on the power shaft, a gear of greater diameter on and shiftable longitudinally of the variable speed driving shaft, a counter-shaft, a pair of gears on the counter-shaft of different diameter, the small and large gears of the power and driving shafts having clutching means, and being arranged to mesh respectively with the large and small gears of the counter-shaft, a shifting rod provided with means for shifting the shiftable gear to mesh with the smaller gear of the counter-shaft, or to couple it with its companion gear whereby two speeds for the variable speed driving shaft are obtained, a driven shaft, means for driving the driven shaft at two speeds relatively to the said driving shaft, whereby the driven shaft may have four speeds relatively to the power shaft, an idle reversing gear, and means also actuated by said shifting rod for shifting the idle gear longitudinally, and for meshing the teeth thereof with the teeth of the shiftable gear and the smaller counter-shaft gear to obtain two reverse speeds for the driven shaft, said shifting rod which is in common with both said shifting means, performing all of the shifting operations aforesaid, substantially as set forth.

3. In speed controlling mechanism for motor vehicles, the combination of a drive shaft, a pair of bevel gears, bearings in which said gears are separately mounted, in axial alinement, the hub of the outer of said gears loosely receiving the outer end of the said shaft, each of said gears having a clutch-portion, a clutch member having a sleeve slidingly mounted on the said shaft and having a bearing throughout its length upon said shaft, the hub of the other said gear receiving said sleeve, and the hub and bearing of the said outer of said gears being located outside of the said clutch member, a driven shaft, a gear on the driven shaft provided with a double series of bevel teeth meshing at all times with the teeth of said bevel gears, and means controlling said clutch member to engage same with the clutch portion of either of said bevel gears, substantially for the purposes set forth.

4. In speed controlling mechanism for motor vehicles, the combination of a drive-shaft, bearings, a pair of separate bevel-gears with coincident axes supported by the bearings, and each provided with a clutch portion, a clutch member turned positively by said shaft and supported by the inner of said bevel-gears, said shaft being supported directly by one of the bevel-gears and directly by the clutch member, and said clutch member having a bearing throughout its entire length upon said shaft, means for engaging said clutch member with either of the clutch portions of the bevel-gears, a driven shaft, a gear on the driven shaft provided with a double series of bevel teeth meshing at all times with the teeth of said bevel-gears, speed reducing gears, and means for changing the position and movements of the speed reducing gears to influence the speed of the drive shaft, substantially for the purposes set forth.

5. In speed controlling mechanism for motor vehicles, the combination of a drive shaft, a pair of bevel-gears, bearings supported independently of the shaft and in which said gears are separately mounted, in axial alinement, the hub of the outer of said gears loosely receiving the outer end of the said shaft, each of said gears having a clutch-portion, a clutch-member having a sleeve slidingly mounted on the said shaft and supported by the inner of said bevel-gears, said clutch member having a bearing throughout its entire length upon said shaft, the hub of the other said gear receiving said sleeve, a driven shaft, a gear on the driven shaft provided with a double series of bevel teeth meshing at all times with the teeth of said bevel-gears, and means controlling said clutch member to engage same with the clutch portion of either of said bevel-gears, substantially for the purposes set forth.

Signed at the city of, county of, and State of New York, this 9th day of July, 1908.

AUSTIN M. WOLF.

Witnesses:
GEO. L. WHEELOCK,
M. TURNER.